United States Patent
Kimura et al.

(10) Patent No.: US 12,078,880 B2
(45) Date of Patent: *Sep. 3, 2024

(54) LIQUID CRYSTAL PANEL AND DISPLAY DEVICE

(71) Applicant: Japan Display Inc., Tokyo (JP)

(72) Inventors: Shunichi Kimura, Tokyo (JP); Toshiharu Matsushima, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,798

(22) Filed: Jun. 5, 2023

(65) Prior Publication Data

US 2023/0393438 A1 Dec. 7, 2023

(30) Foreign Application Priority Data

Jun. 7, 2022 (JP) ................ 2022-092535

(51) Int. Cl.
*G02F 1/1333* (2006.01)
*G02F 1/13* (2006.01)
(Continued)

(52) U.S. Cl.
CPC ...... *G02F 1/133345* (2013.01); *G02F 1/1323* (2013.01); *G02F 1/134309* (2013.01);
(Continued)

(58) Field of Classification Search
None
See application file for complete search history.

(56) References Cited

U.S. PATENT DOCUMENTS

| 10,481,429 B2 | 11/2019 | Koyama et al. |
| 2004/0160561 A1 | 8/2004 | Koma |

(Continued)

FOREIGN PATENT DOCUMENTS

| JP | 2018-092069 A | 6/2018 |
| JP | 2021-081465 A | 5/2021 |

OTHER PUBLICATIONS

U.S. Notice of Allowance issued Jan. 29, 2024, in corresponding U.S. Appl. No. 18/329,642, 30 pages.

(Continued)

*Primary Examiner* — Dung T Nguyen
(74) *Attorney, Agent, or Firm* — XSENSUS LLP (57) ABSTRACT

According to an aspect, a liquid crystal panel includes: a light-transmitting first substrate; a light-transmitting second substrate disposed facing the first substrate with a liquid crystal interposed between the first substrate and the second substrate; a conductive layer provided on the first substrate on a side facing the liquid crystal and comprising wiring lines or electrodes; an insulating layer stacked on the conductive layer on a side facing the liquid crystal; a first electrode layer stacked on the insulating layer on a side facing the liquid crystal; a second electrode layer provided on the second substrate on a side facing the liquid crystal; and a switch capable of opening and closing a coupling path between the first electrode layer and a reset potential. A sheet resistance of the first electrode layer is higher than a sheet resistance of the conductive layer and a sheet resistance of the second electrode layer.

8 Claims, 7 Drawing Sheets

(51) Int. Cl.
*G02F 1/1343* (2006.01)
*G02F 1/1345* (2006.01)
*G02F 1/1362* (2006.01)

(52) U.S. Cl.
CPC .... *G02F 1/134381* (2021.01); *G02F 1/13439* (2013.01); *G02F 1/13454* (2013.01); *G02F 1/13629* (2021.01); *G02F 2202/022* (2013.01); *G02F 2203/62* (2013.01)

(56) References Cited

U.S. PATENT DOCUMENTS

2019/0113790 A1* 4/2019 Hakoi .................. G02F 1/1343
2022/0269128 A1  8/2022 Matsushima

OTHER PUBLICATIONS

U.S. Office Action issued Sep. 29, 2023, in corresponding U.S. Appl. No. 18/329,642, 20 pages.

\* cited by examiner

LIQUID CRYSTAL PANEL AND DISPLAY DEVICE

CROSS-REFERENCE TO RELATED APPLICATION

This application claims the benefit of priority from Japanese Patent Application No. 2022-092535 filed on Jun. 7, 2022, the entire contents of which are incorporated herein by reference.

BACKGROUND

1. Technical Field

What is disclosed herein relates to a liquid crystal panel and a display device.

2. Description of the Related Art

It is known that there is a viewing angle control panel provided to a display surface of a display panel to control the viewing angle so as to inhibit an image on the display panel from being visually recognized when viewed obliquely. Also, it is known that there is a configuration that causes a liquid crystal panel to function like a lens.

For the purpose of more suitably controlling the orientation of the liquid crystal along the direction corresponding to the direction to obliquely view the image and the radial direction of the lens in the panel, there are attempts to cause the electrode that is electrically charged and generates an electric field for controlling the orientation of the liquid crystal to have higher resistance than the conventional technologies. If the electrical resistance of the electrode is higher, however, the electric potential of the electrode may possibly fail to be reset simply by not applying a voltage when it is necessary to reset the electric potential once due to a change in drive control of the liquid crystal.

For the foregoing reasons, there is a need for a liquid crystal panel and a display device that can more reliably reset the electric potential of an electrode to which a drive potential of a liquid crystal is applied.

SUMMARY

According to an aspect, a liquid crystal panel includes: a first substrate that is a light-transmitting substrate; a second substrate that is disposed facing the first substrate with a liquid crystal interposed between the first substrate and the second substrate and is a light-transmitting substrate; a conductive layer provided on the first substrate on a side facing the liquid crystal and comprising a plurality of wiring lines or a plurality of electrodes; an insulating layer stacked on the conductive layer on a side facing the liquid crystal; a first electrode layer stacked on the insulating layer on a side facing the liquid crystal; a second electrode layer provided on the second substrate on a side facing the liquid crystal; and a switch capable of opening and closing a coupling path between the first electrode layer and a reset potential. A sheet resistance of the first electrode layer is higher than a sheet resistance of the conductive layer and a sheet resistance of the second electrode layer.

DETAILED DESCRIPTION

Exemplary embodiments according to the present disclosure are described below with reference to the accompanying drawings. What is disclosed herein is given by way of example only, and appropriate modifications made without departing from the spirit of the present invention and easily conceivable by those skilled in the art naturally fall within the scope of the present disclosure. To simplify the explanation, the drawings may possibly illustrate the width, the thickness, the shape, and other elements of each component more schematically than the actual aspect. These elements, however, are given by way of example only and are not intended to limit interpretation of the present disclosure. In the present specification and the figures, components similar to those previously described with reference to previous figures are denoted by the same reference numerals, and detailed explanation thereof may be appropriately omitted.

Figure 1:
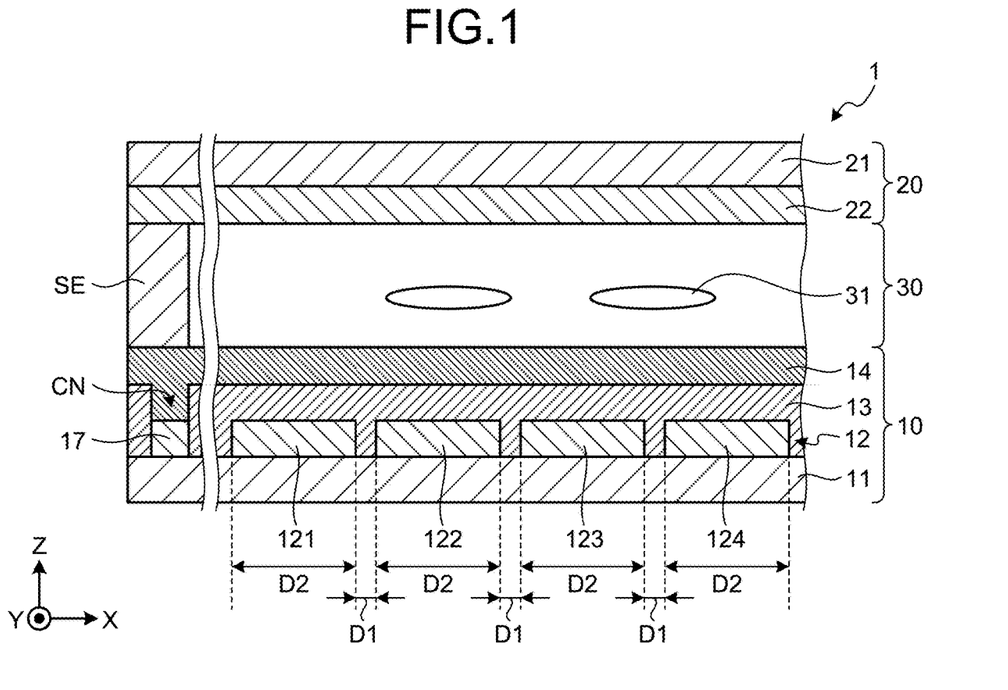
FIG. 1 is a schematic sectional view of the main configuration of a viewing angle control panel.

FIG. 1 is a schematic sectional view of the main configuration of a liquid crystal panel 1. The liquid crystal panel 1 includes substrates 10 and 20 and a liquid crystal 30. The substrate 10 and the substrate 20 face each other with the liquid crystal 30 interposed therebetween. The liquid crystal 30 is sealed by a sealing member SE provided to the outer end of the liquid crystal panel 1. In the following description, the direction in which the substrate 10 and the substrate 20 face each other is referred to as a Z-direction. One of two directions along a plane orthogonal to the Z-direction is an X-direction, and the other is a Y-direction. The X- and Y-directions are orthogonal to each other.

The substrate 10 includes a first substrate 11, a conductive layer 12, an insulating layer 13, and a first electrode layer 14. The first substrate 11 is a light-transmitting substrate. Specifically, the first substrate 11 is a glass substrate, for example, but it may be a thin-plate substrate made of other light-transmitting materials.

The conductive layer 12 is formed on the first substrate 11 on the side facing the liquid crystal 30. The conductive layer 12 is made of light-transmitting conductive material. While the light-transmitting conductive material used for the conductive layer 12 is indium tin oxide (ITO), for example, it is not limited thereto and may be other light-transmitting conductive materials.

The conductive layer 12 includes a plurality of wiring lines arrayed in the X-direction. In FIG. 1, wiring lines 121, 122, 123, and 124 arrayed from one side to the other in the X-direction are illustrated as the wiring lines. The insulating layer 13 is interposed between the wiring lines adjacently disposed in the X-direction out of the wiring lines included in the conductive layer 12. Different wiring lines of the wiring lines included in the conductive layer 12 are insulated in the X-direction by the insulating layer 13 and do not short-circuit.

A space D1 in the X-direction where the insulating layer 13 is interposed between the wiring lines adjacently disposed in the X-direction out of the wiring lines included in the conductive layer 12 is preferably smaller within the region where the wiring lines adjacently disposed in the X-direction do not short-circuit. A width D2 in the X-direction of each of the wiring lines included in the conductive layer 12 corresponds to the arrangement pitch in the X-direction of the wiring lines including the space D1. While the width D2 is several millimeters (mm) to several centimeters (cm), for example, it is not limited thereto and can be appropriately changed.

Figure 3:
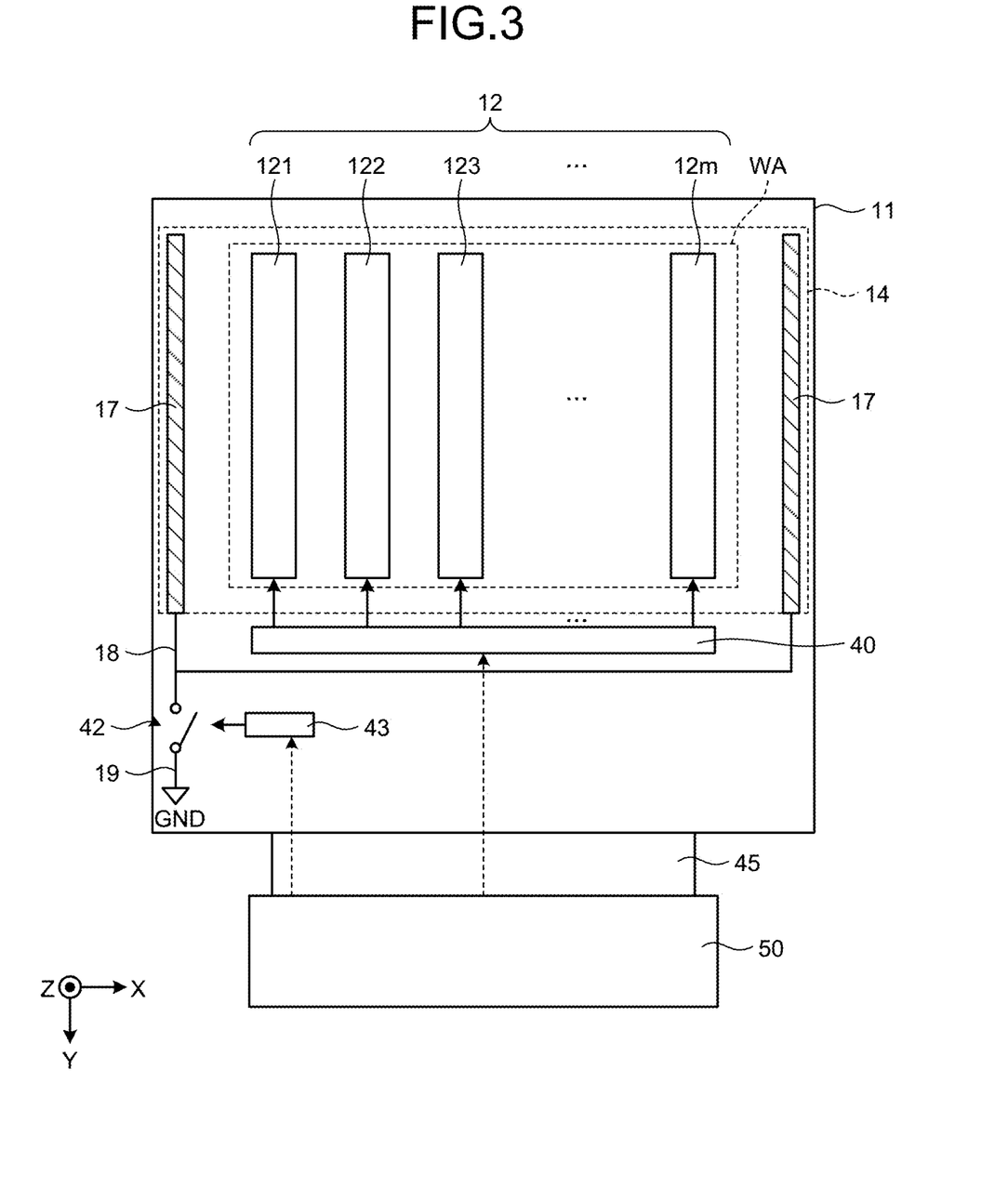
FIG. 3 is a schematic illustrating the configuration included in a conductive layer and the configuration coupled thereto.

FIG. 3 is a schematic illustrating the configuration included in the conductive layer 12 and the configuration coupled thereto. In FIG. 3, wiring lines 121, 122, 123, . . . , and 12m are illustrated as the wiring lines included in the conductive layer 12. m of the wiring line 12m corresponds to the number of wiring lines. m is a natural number. If m is 4, the wiring lines included in the conductive layer 12 is the wiring lines 121, 122, 123, and 124 illustrated in FIG. 1. In the following description, the wiring lines 121, . . . , and 12m refer to the wiring lines included in the conductive layer 12. The region in which the wiring lines 121, . . . , and 12m with the width D2 are arrayed in the X-direction with the space D1 interposed therebetween described above functions as a viewing angle control region, which will be described later. In other words, the wiring lines 121, . . . , and 12m are disposed in the region functioning as the viewing angle control region. More specifically, the "region functioning as the viewing angle control region" corresponds to the region covered by the first electrode layer 14. The wiring lines 121, . . . , and 12m faces the first electrode layer 14, whereby the region covered by the first electrode layer 14 functions as the viewing angle control region, which will be described later.

The wiring lines 121, . . . , and 12m are individually coupled to a drive circuit 40. The drive circuit 40 is a circuit that can individually apply voltages to the wiring lines 121, . . . , and 12m. The drive circuit 40 is coupled to a host 50 via wiring, such as flexible printed circuits (FPC) 45. The host 50 outputs commands relating to the operation of the liquid crystal panel 1, such as turning on/off the operation of the liquid crystal panel 1, to the drive circuit 40. The drive circuit 40 individually applies voltages to the wiring lines 121, . . . , and 12m in accordance with the commands. The FPC 45 illustrated in FIG. 3 is coupled to the drive circuit 40 and an opening/closing circuit 43, which will be described later, via wiring formed on the first substrate 11. In FIG. 3, the wiring formed on the first substrate 11 is represented by the dashed arrows.

The insulating layer 13 is stacked on the conductive layer 12 on the side facing the liquid crystal 30. The insulating layer 13 is made of insulating material. While the insulating material used for the insulating layer 13 is silicon monoxide (SiO), for example, it is not limited thereto and may be silicon nitride (SiN) or other insulating resins. The use of SiO for the insulating layer 13 enables adjusting the electrical resistance of the first electrode layer 14 by adjusting the amount of oxygen supplied when the insulating layer 13 is formed.

The first electrode layer 14 is stacked on the insulating layer 13 on the side facing the liquid crystal 30. The first electrode layer 14 is made of material with higher sheet resistance than the conductive layer 12. Therefore, the first electrode layer 14 functions as a high-resistance electrode. The first electrode layer 14 is made of, for example, a compound containing indium, gallium, zinc, and oxygen (IGZO), indium zinc oxide (IZO), or ITO adjusted to have higher sheet resistance than the conductive layer 12. The insulating layer 13 is interposed between the conductive layer 12 and the first electrode layer 14. In other words, the conductive layer 12 and the first electrode layer 14 are separated by the insulating layer 13.

The substrate 20 includes a second substrate 21 and a second electrode layer 22. The second substrate 21 is a light-transmitting substrate like the first substrate 11. Specifically, the second substrate 21 is a glass substrate, for example, but it may be a thin-plate substrate made of other light-transmitting materials.

The second electrode layer 22 is formed on the second substrate 21 on the side facing the liquid crystal 30. The second electrode layer 22 is made of a light-transmitting conductive material. The second electrode layer 22 has lower sheet resistance than the first electrode layer 14. The light-transmitting conductive material used for the second electrode layer 22 is ITO, which is used for the conductive layer 12, for example, but it is not limited thereto and may be other light-transmitting conductive materials.

The liquid crystal 30 includes a plurality of liquid crystal molecules 31. The orientation of each of the liquid crystal molecules 31 is controlled depending on the potential difference between the electric potential of the first electrode layer 14 and the electric potential of the second electrode layer 22. The transmittance of light traveling from one side to the other in the Z-direction in the liquid crystal panel 1 corresponds to the orientation of the liquid crystal molecules 31. In other words, the light transmittance of the liquid crystal panel 1 can be controlled by controlling the potential difference between the electric potential of the first electrode layer 14 and the electric potential of the second electrode layer 22.

The electric potential of the second electrode layer 22 according to the embodiment is a fixed potential. Specifically, the electric potential of the second electrode layer 22 is the ground potential (0 V), for example, but it is not limited thereto and can be appropriately changed. Therefore, the light transmittance of the liquid crystal panel 1 is controlled by controlling the electric potential of the first electrode layer 14.

The electric potential of the first electrode layer 14 corresponds to the voltage applied to the wiring lines 121, . . . , and 12m. Therefore, when the voltages individually applied to the respective wiring lines 121, . . . , and 12m are different from each other, the electric potential of the first electrode layer 14 varies depending on the position in the X-direction.

Figure 2:
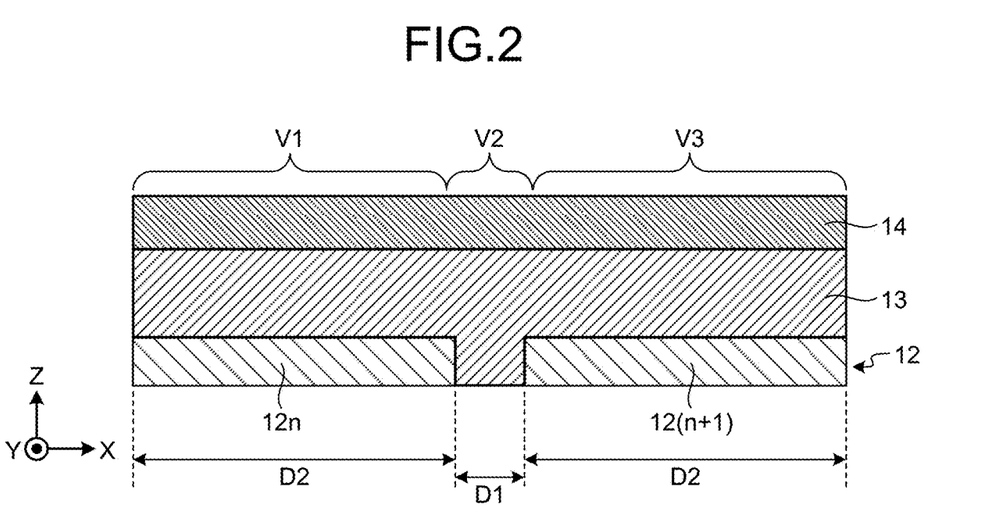
FIG. 2 is a schematic illustrating the potential difference in regions of a first electrode layer in an X-direction generated due to voltages applied to respective two wiring lines adjacently disposed in the X-direction.

FIG. 2 is a schematic illustrating the potential difference in regions of the first electrode layer 14 in the X-direction generated due to the voltages applied to a wiring line 12n and a wiring line 12(n+1) adjacently disposed in the X-direction. The wiring lines 12n and 12(n+1) are included in the wiring lines 121, ..., and 12m. n is a natural number. (n+1) is equal to or smaller than m. When n=1 is satisfied, for example, the wiring lines 12n and 12(n+1) are the wiring lines 121 and 122, respectively.

The electric potential of the first electrode layer 14 mainly corresponds to the voltage of the wiring line facing the first electrode layer 14 in the Z-direction out of the wiring lines included in the conductive layer 12. In the example illustrated in FIG. 2, the electric potential of a region V1 of the first electrode layer 14 facing the wiring line 12n in the Z-direction corresponds to the voltage of the wiring line 12n. The electric potential of a region V3 of the first electrode layer 14 facing the wiring line 12(n+1) in the Z-direction corresponds to the voltage of the wiring line 12(n+1).

The electric potential of a non-facing region of the first electrode layer 14 not facing the wiring lines included in the conductive layer 12 in the Z-direction and a region near the non-facing region correspond to the electric potentials of the two regions facing each other in the X-direction with the non-facing region interposed therebetween. In the example illustrated in FIG. 2, a region V2 of the first electrode layer 14 positioned between the region V1 and the region V3 corresponds to the non-facing region not facing the wiring lines included in the conductive layer 12 in the Z-direction and a region near the non-facing region. The electric potential of the region V2 is an intermediate potential between the electric potentials of the regions V1 and V3.

If the sheet resistance of the first electrode layer 14 is too low, the potential difference is not generated in the regions V1, V2, and V3, and the electric potential is constant over the entire first electrode layer 14. By contrast, if the sheet resistance of the first electrode layer 14 is too high, the first electrode layer 14 functions as an insulator and is not electrically charged corresponding to the voltage applied to the conductive layer 12. The sheet resistance of the first electrode layer 14 is adjusted such that the electric potentials of the regions V1, V2, and V3 are different when the voltages of the wiring lines 12n and 12(n+1) are different.

Specifically, the sheet resistance of the conductive layer 12 and the second electrode layer 22 is approximately 100 $\Omega$/sq. The sheet resistance of the first electrode layer 14 is approximately $10^4$ to $10^6$ $\Omega$/sq. The resistance ratio between the sheet resistance of the first electrode layer 14 and the sheet resistance of the conductive layer 12 is preferably approximately 100:1 to 10,000:1.

The thicknesses of the conductive layer 12, the insulating layer 13, and the first electrode layer 14 in the Z-direction depend on the materials used for the conductive layer 12, the insulating layer 13, and the first electrode layer 14, respectively. In this example, the conductive layer 12 is made of ITO, the insulating layer 13 is made of SiO, and the first electrode layer 14 is made of IGZO. In this case, the thickness of the conductive layer 12 is 70 nanometers (nm), the thickness of the insulating layer 13 is 200 nm, and the thickness of the first electrode layer 14 is 50 nm. The thickness of the insulating layer 13 includes the part interposed between the wiring lines adjacently disposed in the X-direction out of the wiring lines included in the conductive layer 12. In other words, the thickness of the insulating layer 13 is the thickness between the first substrate 11 and the first electrode layer 14.

The drive circuit 40 according to the embodiment described with reference to FIG. 2 applies different voltages to the respective wiring lines 121, ..., and 12m. This configuration enables controlling the light transmittance corresponding to the difference in viewing angle between one end and the other end in the X-direction in the liquid crystal panel 1 when the liquid crystal panel 1 is viewed from a line of sight inclined in the X-direction with respect to the Z-direction.

Figure 4:
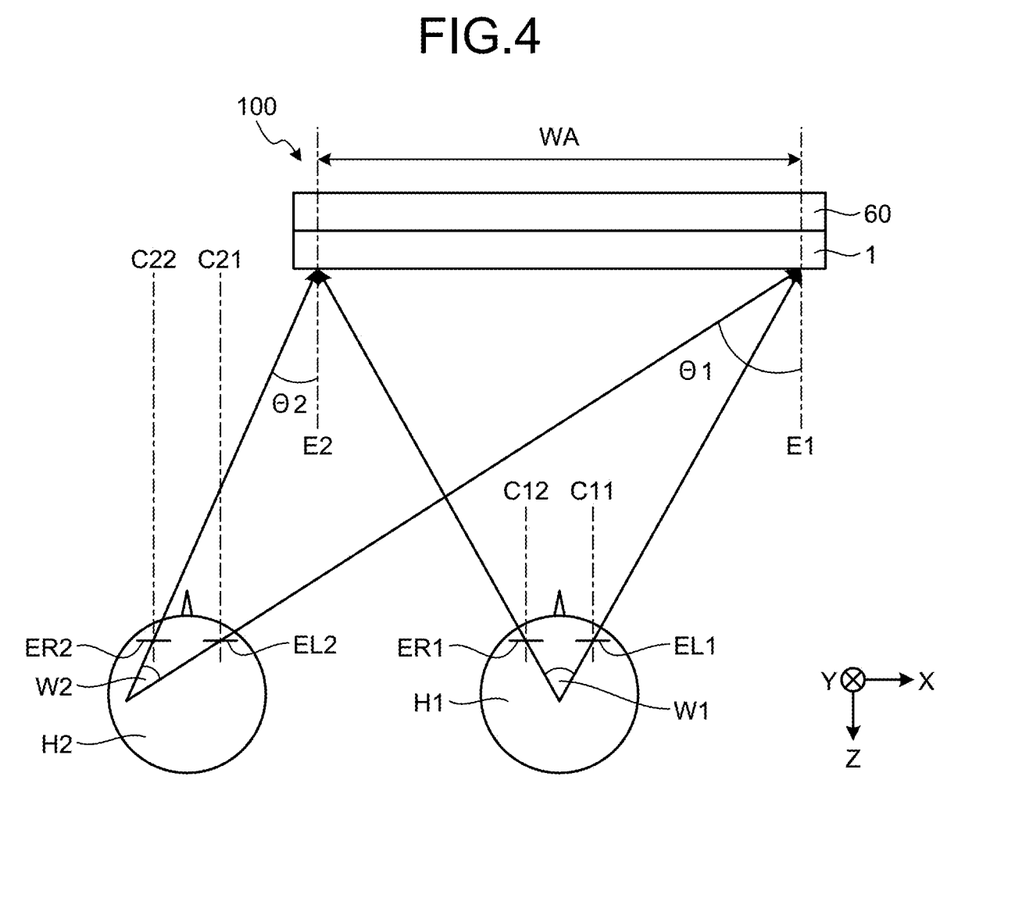
FIG. 4 is a schematic of an example of the difference in viewing angle between one end and the other end in the X-direction in the viewing angle control panel when the viewing angle control panel is viewed from a line of sight inclined in the X-direction with respect to a Z-direction.

FIG. 4 is a schematic of an example of the difference in viewing angle between one end and the other end in the X-direction in the liquid crystal panel 1 when the liquid crystal panel 1 is viewed from a line of sight inclined in the X-direction with respect to the Z-direction. FIG. 4 illustrates an example where a user H1 and a user H2 visually recognize a display image output by a display device 100 composed of a display panel 60 and the liquid crystal panel 1 stacked in the Z-direction.

The display panel 60 outputs an image. Specifically, the display panel 60 is a transmissive liquid crystal display device, for example, and the liquid crystal panel 1 is provided on the line of light traveling from the backlight toward the users H1 and H2 and controls the degree of transmission of light of the image output from the display panel 60 toward the users H1 and H2. While the liquid crystal panel 1 is provided at a position between the display panel 60 and the users H1 and H2, for example, it may be provided on the opposite side of the display panel 60 provided with the backlight.

A left eye EL1 and a right eye ER1 of the user H1 are positioned side by side in the X-direction. The liquid crystal panel 1 and the display panel 60 are stacked in the Z-direction on the extension lines of a line of sight C11 of the left eye EL1 along the Z-direction and a line of sight C12 of the right eye ER1 along the Z-direction. Thus, the user H1 is at a position to view the display panel 60 from the front through the liquid crystal panel 1.

By contrast, a left eye EL2 and a right eye ER2 of the user H2 are positioned side by side in the X-direction. The liquid crystal panel 1 and the display panel 60 are not positioned on the extension lines of a line of sight C21 of the left eye EL2 along the Z-direction and a line of sight C22 of the right eye ER2 along the Z-direction. Thus, the user H2 is at a position to view the display panel 60 obliquely in the X-direction through the liquid crystal panel 1.

There is a demand to enable an image output by the display panel 60 to be visually recognized by the user H1 and inhibit it from being visually recognized by the user H2. In a specific example where such a demand arises, the display panel 60 is a display device mounted on a four-wheeled vehicle, the user H2 is a driver of the four-wheeled vehicle, and the user H1 is a passenger in the passenger seat of the four-wheeled vehicle. Not limited to this specific example, there is a demand to cause an image to be visually recognized only by a person, such as the user H1, who is in front of a display device, such as the display panel 60, and inhibit the image from being visually recognized by a person, such as the user H2, who obliquely views the display device.

A field of view W1 of the user H1 extends in the X-direction so as to view the display panel 60 from the front through the liquid crystal panel 1 and has substantially no difference between the angle with respect to a first end E1 and the angle with respect to a second end E2 of both ends in the X-direction of an image display region in the display panel 60.

By contrast, a field of view W2 of the user H2 has a significant difference between an angle $\theta 1$ with respect to the first end E1 and an angle $\theta 2$ with respect to the second end E2 of both ends in the X-direction of the display panel and the liquid crystal panel 1. Specifically, the angle el with respect to the first end E1 positioned relatively far from the user H2 in the X-direction is significantly larger than the angle θ2 with respect to the second end E2 positioned relatively close to the user H2 in the X-direction. If the display panel 60 has uniform light transmittance regardless of the position in the X-direction, the user H2 having such a field of view W2 cannot visually recognize an image output from the display panel 60 at the first end E1 but may possibly be able to visually recognize it at the second end E2.

Figure 5:
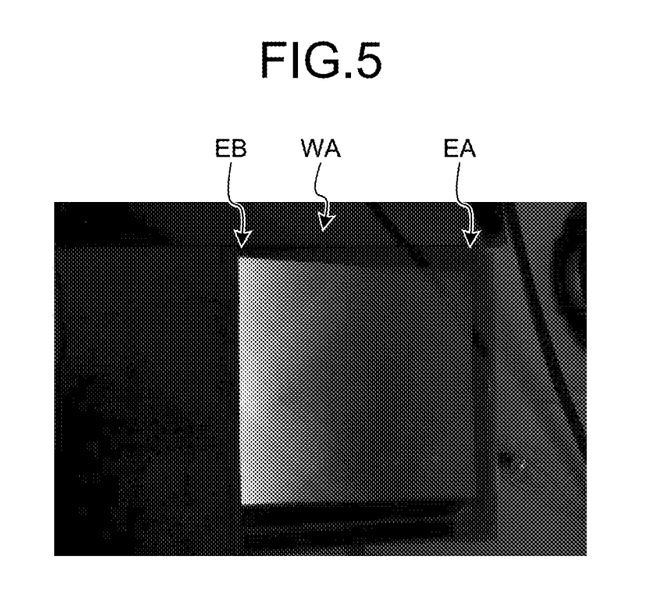
FIG. 5 is a view of a reference example where an image can be visually perceived as if the light transmittance differs between a far position and a near position in oblique view.

FIG. 5 is a view of a reference example of a viewing angle control region WA where an image can be visually perceived as if the light transmittance differs between a far position EA and a near position EB in oblique view. In FIG. 5, the liquid crystal is supplied with a uniform voltage from the far position EA to the near position EB. Therefore, a difference in light transmittance depending on the viewing angle characteristics of the panel is apparent between the far position EA and the near position EB in oblique view. Specifically, the far position EA is relatively dark because almost no light is transmitted at the far position EA, whereas light is transmitted at the near position EB by such an amount that the near position EB appears clearly brighter than the far position EA. In this reference example, the image output from the display panel 60 is relatively likely to be visually recognized at the near position EB.

To address this, the embodiment has a mechanism to vary the light transmittance of the liquid crystal panel 1 depending on the position in the X-direction. Specifically, as described with reference to FIG. 3, the drive circuit 40 can individually apply voltages to the wiring lines 121, ..., and 12m. The drive circuit 40 applies different voltages to the respective wiring lines 121, ..., and 12m.

Figure 6:
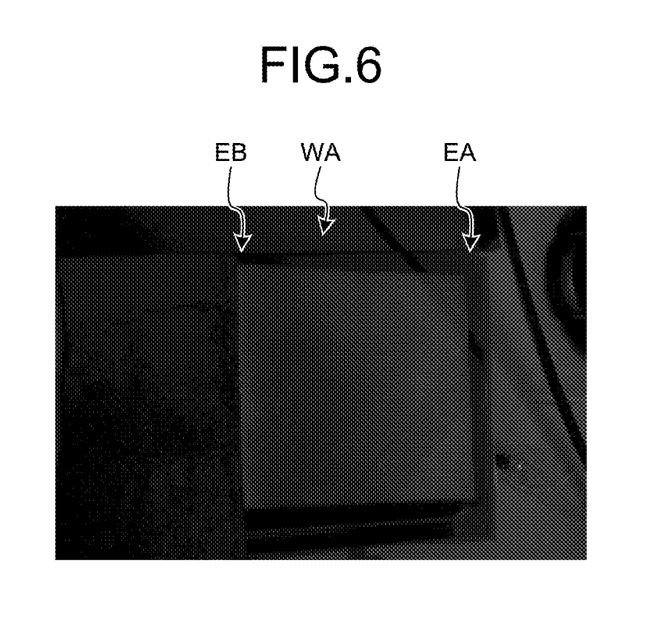
FIG. 6 is a view of an example according to an embodiment where the light transmittance is more uniform between the far position and the near position in oblique view than in the reference example illustrated in FIG. 5.

FIG. 6 is a view of an example of the viewing angle control region WA according to the embodiment where the light transmittance is more uniform between the far position EA and the near position EB in oblique view than in the reference example illustrated in FIG. 5. In the embodiment, the brightness at the far position EA and the near position EB in oblique view more is made uniform than in the reference example. In other words, the far position EA and the near position EB according to the embodiment have almost no difference in light transmittance in oblique view. Therefore, the embodiment can reduce the occurrence of the state where the image output from the display panel can be visually recognized at the near position EB, which occurs in the reference example. The far position EA corresponds to the first end E1 in FIG. 4, for example. The near position EB corresponds to the second end E2 in FIG. 4, for example.

FIG. 6 illustrates an example where m=9 is satisfied in the wiring lines 121, ..., and 12m, a voltage of 3.1 volts (V) is applied to the wiring line closest to the near position EB, and voltages of 3.0 V, 2.9 V, 2.8 V, 2.8 V, 2.7 V, 2.7 V, 2.6 V, and 2.5 V are applied to the other wiring lines arrayed in order from the wiring line applied with 3.1 V toward the far position EA. When the voltages of adjacent wiring lines are different, the region facing one of the adjacent wiring lines in the first electrode layer 14 corresponds to the region V1, the region facing the other of the adjacent wiring lines corresponds to the region V3, and the region V2 between the region V1 and the region V3 has an intermediate potential between the electric potential of the region V1 and the electric potential of the region V3 as described with reference to FIG. 2. The voltage of the second electrode layer 22 is 0 V.

To control the light transmittance, the image display region in the display panel 60 described with reference to FIG. 4, that is, the region covering from the first end E1 to the second end E2 serves as the viewing angle control region of the liquid crystal panel 1 as described with reference to FIG. 6. In other words, the first electrode layer 14 is provided in the region covering from the first end E1 to the second end E2, and the wiring lines 121, ..., and 12m are disposed facing the first electrode layer 14. This configuration enables light transmittance control, such as the viewing angle control region WA, described with reference to FIG. 6.

The liquid crystal 30 employs what is called a twisted nematic (TN) system and is controlled so as to achieve light distribution corresponding to the potential difference between the first electrode layer 14 and the second electrode layer 22. Although not illustrated in FIG. 1 and other figures, orientation films (e.g., polyimide layers) that define the initial orientation of the liquid crystal molecules 31 are formed on the first electrode layer 14 on the side facing the liquid crystal 30 and on the second electrode layer 22 on the side facing the liquid crystal 30. The orientation films are provided to achieve, for example, what is called a normally white mode in which the degree of the light transmittance of the liquid crystal panel 1 is maximized in initial orientation of the liquid crystal molecules 31 with no electric field formed between the first electrode layer 14 and the second electrode layer 22. The orientation films may be provided to achieve what is called a normally black mode in which the degree of the light transmittance of the liquid crystal panel 1 is minimized in initial orientation of the liquid crystal molecules 31 with no electric field formed between the first electrode layer 14 and the second electrode layer 22.

As described above, the first electrode layer 14 is electrically charged corresponding to the voltages applied to the wiring lines included in the conductive layer 12. Normally, when application of the voltages to the conductive layer 12 is stopped, the electric charge accumulated in the first electrode layer 14 is discharged, and the first electrode layer 14 has the electric potential equivalent to that of the second electrode layer 22 (e.g., ground potential). However, if the first electrode layer 14 is in what is called a floating state of not being electrically coupled to any other configuration, the electric charge may possibly fail to be smoothly discharged after a certain point of time at which application of the voltages to the wiring lines included in the conductive layer 12 is stopped. In this case, when the voltage is re-applied to the wiring lines included in the conductive layer 12 after the certain point of time, the effect of the electric charge of the first electrode layer 14 corresponding to the voltages applied to the wiring lines included in the conductive layer 12 before the certain point of time may possibly remain after the certain point of time.

To address this, the embodiment has a mechanism for reliably discharging the first electrode layer 14. Specifically, the liquid crystal panel 1 includes a switch (e.g., a switch 42 illustrated in FIG. 3) that can switch coupling and decoupling between the first electrode layer 14 and a configuration having the ground potential.

As illustrated in FIG. 3, the first electrode layer 14 is coupled to the switch 42 via a conductor 17 and coupling path wiring 18. The switch 42 couples the coupling path wiring 18 and coupling path wiring 19. The coupling path wiring 19 is coupled to a configuration assuming the ground potential GND serving as a reset potential. The following describes the mechanism for reliably discharging the first electrode layer 14 in greater detail with reference to FIGS. 1 and 3.

In the example illustrated in FIGS. 1 and 3, the first electrode layer 14 is coupled to the conductor 17 through a contact hole CN. At the contact hole CN, the conductor 17 illustrated in FIG. 1 is included in the conductive layer 12. The conductor 17 according to the embodiment is formed by the same material as that of the wiring lines 121, ..., and 12m in the same process as the formation process of the conductive layer 12.

The conductor 17 according to the embodiment is positioned outside the viewing angle control region WA. The contact hole CN is positioned on the conductor 17 on the side facing the liquid crystal 30 in the insulating layer 13 and formed to couple the first electrode layer 14 and the conductor 17 in the Z-direction. The same material as that of the first electrode layer 14 enters into the contact hole CN. The conductor 17 illustrated in FIG. 3 is provided near both ends of the first electrode layer 14 in the X-direction. While FIG. 1 illustrates the conductor 17 at one end in the X-direction, for example, the same structure is provided at the other end in the X-direction. The conductor 17 may be provided separately from the wiring lines 121, ..., and 12m and made of conductive material (non-light-transmitting conductive material, what is called metal wiring) different from that of the conductive layer 12.

The coupling path wiring 18 couples the conductor 17 and one end of the opening/closing path formed by the switch 42. The coupling path wiring 18 is formed on the first substrate 11. The coupling path wiring 18 may be formed simultaneously with and by the same material as the wiring lines 121, ..., and 12m in the same process as the formation process of the wiring lines 121, ..., and 12m, in the same manner as the wiring lines and the conductor 17 included in the conductive layer 12, for example.

Alternatively, the coupling path wiring 18 may be pattern wiring formed in advance on the first substrate 11 on the side facing the liquid crystal 30 before the formation process of the wiring lines 121, ..., and 12m. The pattern wiring may be metal wiring. The coupling path wiring 18 is provided outside the viewing angle control region WA. The coupling path wiring 18 is provided to couple the switch 42 and both the conductor 17 on one side of the first electrode layer 14 in the X-direction and the conductor 17 on the other side of the first electrode layer 14 in the X-direction.

The switch 42 functions as a switch that can open and close the coupling between the coupling path wiring 18 and the coupling path wiring 19. The other end of the opening/closing path formed by the switch 42 is coupled to the coupling path wiring 19. The coupling path wiring 19 couples the other end of the opening/closing path formed by the switch 42 and the configuration indicating the ground potential GND. The configuration assuming the ground potential GND may be, for example, a flat-shaped conductive member provided to the liquid crystal panel 1 or an external grounding point coupled via the FPC 45.

The embodiment includes an opening/closing circuit 43 as a configuration that controls the opening and closing of the switch 42. The opening/closing circuit 43 controls the opening and closing of the switch 42 in conjunction with the voltage control for the conductive layer 12 by the drive circuit 40. Specifically, the opening/closing circuit 43 controls the operation of the switch 42 such that the coupling path wiring 18 and the coupling path wiring 19 are decoupled from each other during the period when the drive circuit 40 continues to apply the same voltage to the wiring lines 121, ..., and 12m. When the voltage applied to the wiring lines 121, ..., and 12m by the drive circuit 40 is changed, the opening/closing circuit 43 controls the operation of the switch 42 such that a period during which the coupling path wiring 18 and the coupling path wiring 19 are coupled is provided in the period between before and after the switching. The opening/closing circuit 43 may operate the switch 42 such that the coupling path wiring 18 and the coupling path wiring 19 are coupled during the period when the drive circuit 40 applies no voltage to the wiring lines 121, ..., and 12m.

The opening/closing circuit 43 may operate under the control of the host 50 or the drive circuit 40. In any case, the operation of the opening/closing circuit 43 is linked with the operation relating to the application of the voltages to the wiring lines 121, ..., and 12m by the drive circuit 40.

As described above, the liquid crystal panel 1 serving as a liquid crystal panel according to the embodiment includes the first substrate 11, the second substrate 21, the conductive layer 12, the insulating layer 13, the first electrode layer 14, the second electrode layer 22, and the switch 42. The first substrate 11 is a light-transmitting substrate. The second substrate 21 is disposed facing the first substrate 11 with the liquid crystal 30 interposed therebetween and is a light-transmitting substrate. The conductive layer 12 is provided on the first substrate 11 on the side facing the liquid crystal 30 and includes a plurality of wiring lines arrayed in the X-direction. The insulating layer 13 is stacked on the conductive layer 12 on the side facing the liquid crystal 30. The first electrode layer 14 is stacked on the insulating layer 13 on the side facing the liquid crystal 30. The second electrode layer 22 is provided on the second substrate 21 on the side facing the liquid crystal 30. The switch 42 can open and close the coupling path between the first electrode layer 14 and the reset potential (e.g., the ground potential GND). The sheet resistance of the first electrode layer 14 is higher than that of the conductive layer 12 and that of the second electrode layer 22. This configuration can form an electric field in the first electrode layer 14 in which the electric potential is gradually increased or decreased from one side to the other along an array direction of the wiring lines included in the conductive layer 12. If a user (e.g., the user H2) obliquely views an image output from a display panel (e.g., the display panel 60) through the liquid crystal panel 1, the liquid crystal panel 1 can form a difference in light transmittance between a relatively near end (e.g., the second end E2) and a relatively far end (e.g., the first end E1) from the user, which corresponds to the difference in viewing angle from the user in the array direction. Therefore, the liquid crystal panel 1 can more reliably inhibit an image from being visually recognized from an oblique viewpoint. Furthermore, the coupling path between the first electrode layer 14 and the reset potential is provided in an openable and closeable manner, whereby the liquid crystal panel 1 can couple the first electrode layer 14 to the reset potential in a simpler manner by controlling the operation of the switch 42. Therefore, the liquid crystal panel 1 can more reliably reset the electric potential of the first electrode layer 14 serving as the electrode to which the drive potential of the liquid crystal 30 is applied.

The conductive layer 12 includes the conductor 17 interposed in the conduction path between the first electrode layer 14 and the switch 42, and the insulating layer 13 has the contact hole CN that couples the first electrode layer 14 and the conductor 17. This configuration enables the coupling path to the first electrode layer 14 to be formed simultaneously with the formation of the conductive layer 12.

The conductor 17 is provided along two or more of the four sides of the rectangular first electrode layer 14. This configuration can make the coupling area between the first electrode layer 14 and the conductor 17 larger, thereby enabling more smoothly resetting the electric potential of the first electrode layer 14 when the coupling path is coupled.

The conductive layer 12 and the first electrode layer 14 are separated by the insulating layer 13, and each of the conductive layer 12, the first electrode layer 14, and the second electrode layer 22 is a light-transmitting layer. With this configuration, the first electrode layer 14 can more reliably form an intermediate potential between two wiring lines adjacently disposed in the array direction (X-direction) of the wiring lines included in the conductive layer 12. Since each of the conductive layer 12, the first electrode layer 14, and the second electrode layer 22 is a light-transmitting layer, it is possible to further enhance the visibility of the image to a user (e.g., the user H1) who views the image output from the display panel (e.g., the display panel 60) from the front through the liquid crystal panel 1.

The liquid crystal panel 1 also includes a drive circuit 40 capable of individually applying voltages to the wiring lines included in the conductive layer 12. This configuration can facilitate voltage control for gradually increasing or decreasing the voltage applied to the wiring lines from one end to the other in the array direction of the wiring lines.

The liquid crystal panel 1 also includes the opening/closing circuit 43 that controls the opening and closing of the switch 42 in conjunction with the operation of the drive circuit 40. With this configuration, the liquid crystal panel 1 can reset the first electrode layer 14 at a more appropriate timing.

The display device 100 includes the display panel 60 and the liquid crystal panel 1. The display panel 60 displays an image. The liquid crystal panel 1 is stacked on the display surface of the display panel 60. The display device 100 can more reliably inhibit an image from being visually recognized from an oblique viewpoint.

The specific aspect of the liquid crystal panel functioning as a viewing angle control panel according to the embodiment is not limited to the configuration described with reference to FIGS. 1 and 3. The following describes modifications of the liquid crystal panel functioning as a viewing angle control panel with reference to FIGS. 7 to 9. In the description of the modifications, components similar to those according to the embodiment are denoted by the same reference numerals, and explanation thereof may be omitted.

First Modification

Figure 7:
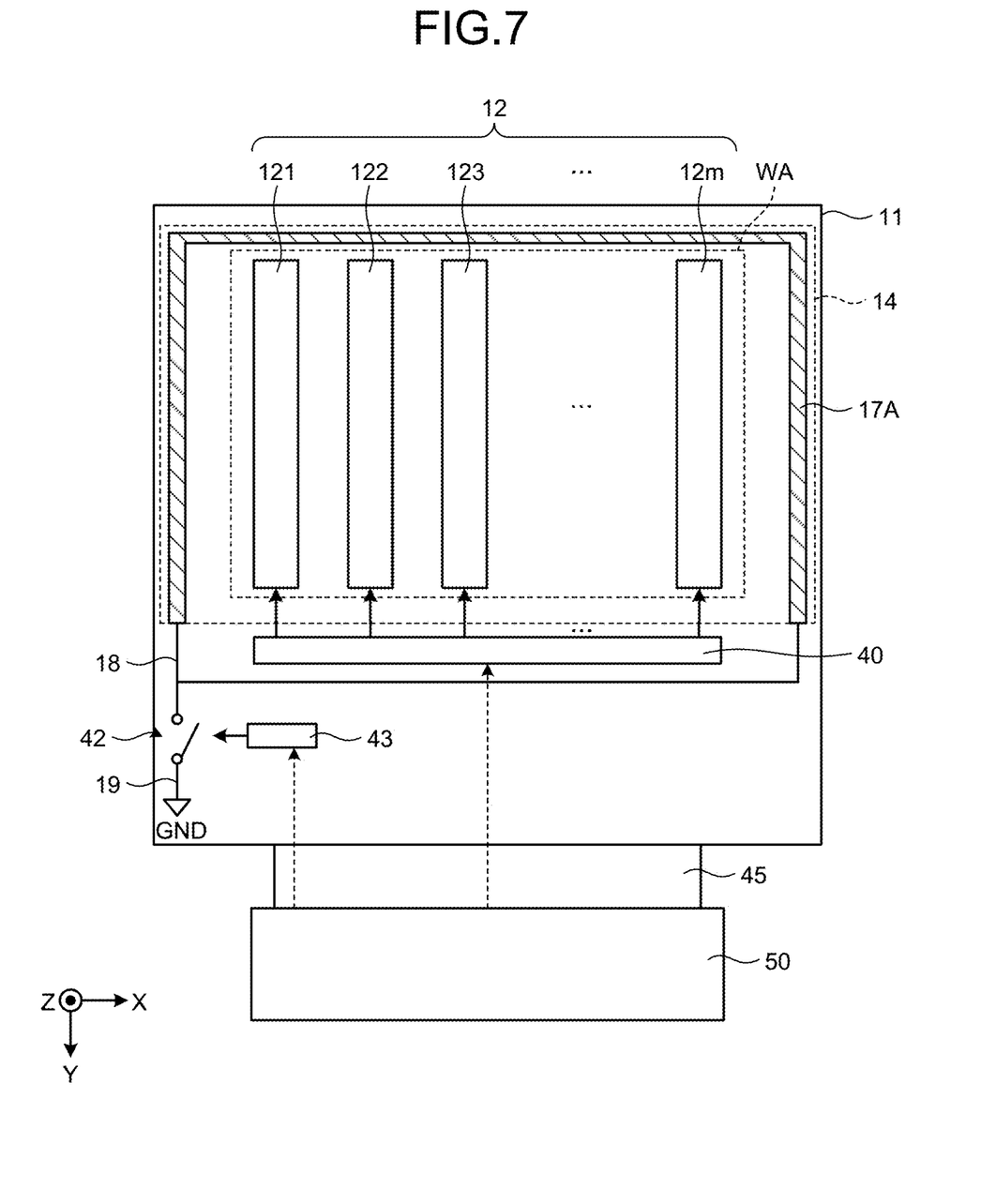
FIG. 7 is a schematic illustrating the configuration included in the conductive layer and the configuration coupled thereto according to a first modification.

FIG. 7 is a schematic illustrating the configuration included in the conductive layer 12 and the configuration coupled thereto according to a first modification. Instead of the conductor 17 according to the embodiment described with reference to FIG. 3, the first modification is provided with a conductor 17A. The conductor 17 according to the embodiment and the conductor 17A according to the first modification are different in shape and arrangement when viewed from the viewpoint of viewing a plane orthogonal to the Z-direction from the front. The conductor 17A is provided continuously along three of the four sides of the rectangular first electrode layer 14 when viewed from the viewpoint of viewing the plane orthogonal to the Z-direction from the front. Both ends of the conductor 17A are coupled to the coupling path wiring 18 on one of the four sides where the conductor 17A does not extend. Except for the above noted items, the liquid crystal panel according to the first modification is the same as the liquid crystal panel 1 according to the embodiment.

Second Modification

Figure 8:
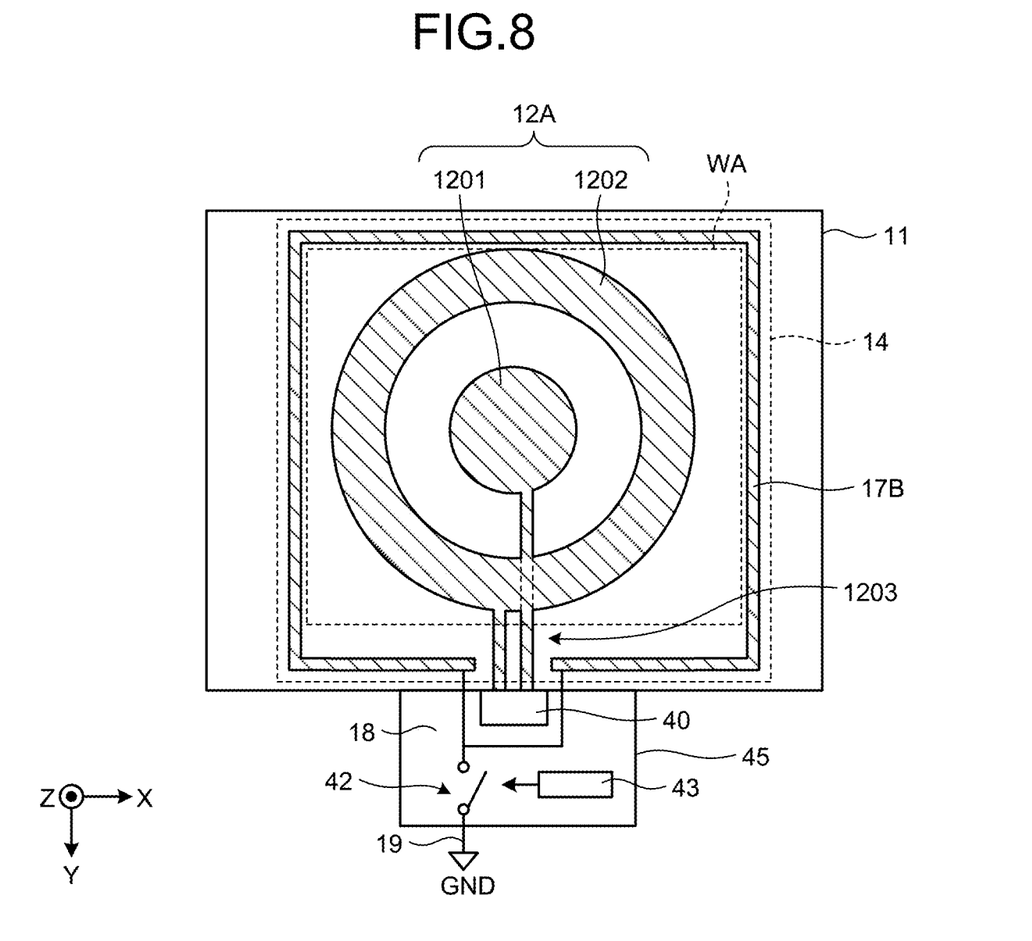
FIG. 8 is a schematic illustrating the configuration included in the conductive layer and the configuration coupled thereto according to a second modification.

FIG. 8 is a schematic illustrating the configuration included in the conductive layer 12 and the configuration coupled thereto according to a second modification. Instead of the conductive layer 12 according to the embodiment described with reference to FIGS. 1 and 3, the second modification is provided with a conductive layer 12A. The conductive layer 12A includes a plurality of electrodes, such as electrodes 1201 and 1202, arranged along the radial direction of a circle. The electrode 1201 disposed at the center of the circle has a circular shape. The electrode 1202 disposed outside the electrode 1201 in the radial direction of the circle has an annular shape.

While FIG. 8 illustrates only the electrode 1202 as an electrode having an annular shape, the conductive layer 12A may include a plurality of concentric annular or arc-shaped electrodes with different diameters. With a plurality of electrodes, such as the electrodes 1201 and 1202, arranged along the radial direction of the circle, the liquid crystal panel according to the second modification can control the travel direction of light by the orientation of the liquid crystal molecules 31 included in the liquid crystal 30 like a concave or convex lens. In other words, the liquid crystal panel according to the second modification provided with the conductive layer 12A functions as what is called a liquid crystal lens panel. The embodiment provided with a plurality of electrodes arranged along the X-direction can also control the orientation of the liquid crystal molecules 31 so as to function like a one-dimensional lens.

Instead of the conductor 17 according to the embodiment described with reference to FIG. 3, the second modification is provided with a conductor 17B. The conductor 17B is provided continuously along the four sides of the rectangular first electrode layer 14 when viewed from the viewpoint of viewing the plane orthogonal to the Z-direction from the front, except for the part provided with a wiring unit 1203 that couples the electrodes included in the conductive layer 12A and the drive circuit The drive circuit 40, the coupling path wiring 18, the switch 42, the opening/closing circuit 43, and the coupling path wiring 19 according to the second modification are provided on the FPC 45. This is given by way of example only, and the configuration is not limited thereto. The drive circuit 40, the coupling path wiring 18, the switch 42, the opening/closing circuit 43, and the coupling path wiring 19 according to the second modification may be provided on the first substrate 11 in the same manner as the embodiment. Alternatively, the drive circuit 40, the coupling path wiring 18, the switch 42, the opening/closing circuit 43, and the coupling path wiring 19 according to at least one of the embodiment and the first modification may be provided on the FPC 45 as illustrated in FIG. 8. Except for the above noted items, the structure of the liquid crystal lens panel according to the second modification is the same as that of the liquid crystal panel 1 according to the embodiment.

The conductive layer 12A may be provided instead of the conductive layer 12 according to the embodiment and the first modification. In other words, the configuration coupled to the first electrode layer 14 according to the second modification is not limited to the conductor 17B and may be the conductor 17 or the conductor 17A. The conductor 17 according to the embodiment and the conductor 17A according to the first modification may be replaced by a configuration that can cover more sides of the four sides like the conductor 17B if the configuration can be provided without interfering with the coupling between the conductive layer 12 and the drive circuit 40. The specific aspect of the configuration coupled to the first electrode layer 14 in the Z-direction is not limited to the conductors 17, 17A, and 17B and simply needs to be at least electrically coupled to the first electrode layer 14, and its specific shape is not limited.

Third Modification

Figure 9:
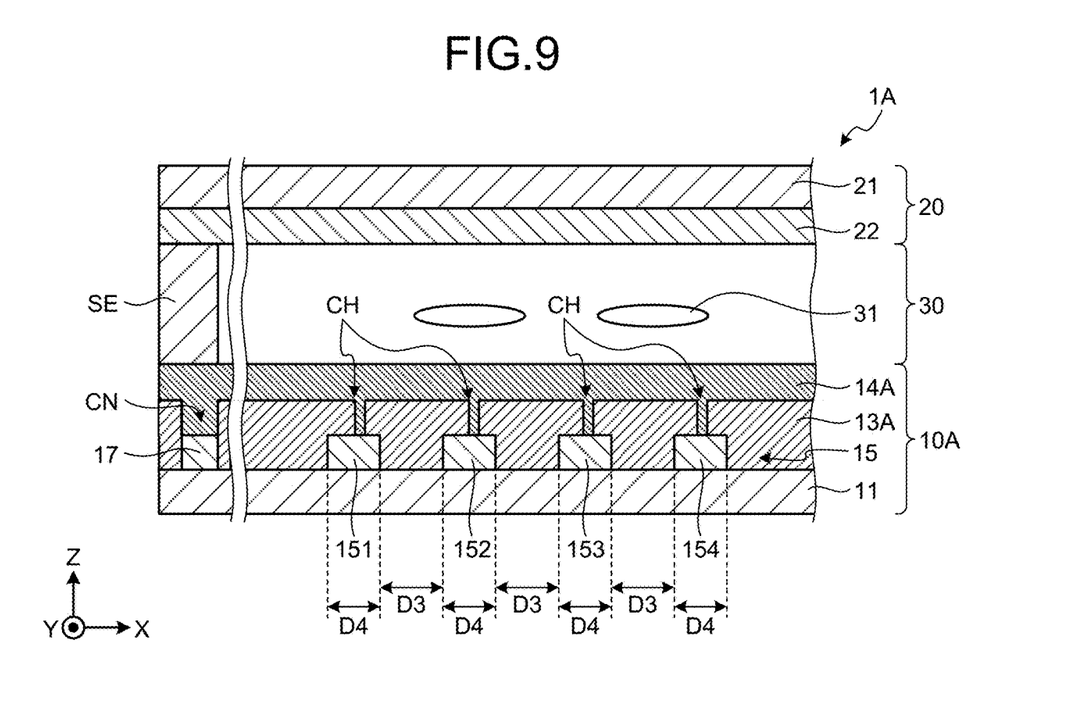
FIG. 9 is a schematic sectional view of the main configuration of the viewing angle control panel.

FIG. 9 is a schematic sectional view of the main configuration of a liquid crystal panel 1A. The liquid crystal panel 1A includes a substrate 10A instead of the substrate 10 of the liquid crystal panel 1 described with reference to FIG. 1. The substrate 10A includes the first substrate 11, a conductive layer 15, an insulating layer 13A, and a first electrode layer 14A.

The conductive layer 15 in the liquid crystal panel 1A is provided instead of the conductive layer 12 in the liquid crystal panel 1. The conductive layer 15 is formed on the first substrate 11 on the side facing the liquid crystal 30. The conductive layer 15 may be made of a light-transmitting conductive material or metal wiring with a lower sheet resistance than the conductive layer 12. While the light-transmitting conductive material used for the conductive layer 15 is copper, for example, it is not limited thereto and may be other conductive materials.

Similarly to the conductive layer 12, the conductive layer 15 includes a plurality of wiring lines arrayed in the X-direction. In FIG. 9, wiring lines 151, 152, 153, and 154 arrayed from one side to the other in the X-direction are illustrated as the wiring lines. Similarly to the wiring lines 121, . . . , and 12m included in the conductive layer 12 in the liquid crystal panel 1, the wiring lines included in the conductive layer 15 in the liquid crystal panel 1A can be represented as wiring lines 151, . . . , and 15m. The wiring lines 151, 152, 153, and 154 illustrated in FIG. 9 are an example of the wiring lines when m=4 is satisfied.

The wiring lines included in the conductive layer 15 are individually coupled to the drive circuit 40 similarly to the wiring lines 121, . . . , and 12m described with reference to FIG. 3. The drive circuit 40 individually applies voltages to the wiring lines included in the conductive layer 15. The insulating layer 13A is interposed between the wiring lines adjacently disposed in the X-direction out of the wiring lines included in the conductive layer 15. Different wiring lines of the wiring lines included in the conductive layer 15 are insulated in the X-direction by the insulating layer 13A and do not short-circuit. The insulating layer 13A is stacked on the conductive layer 15 on the side facing the liquid crystal 30. The insulating layer 13A has contact holes CH at the positions in contact with the respective wiring lines (e.g., the wiring lines 151, 152, 153, and 154) included in the conductive layer 15 in the Z-direction as illustrated in FIG. 9. The contact hole CH is a hole passing through the insulating layer 13A in the Z-direction. The first electrode layer 14A enters into the contact holes CH. Except for the above noted items, the insulating layer 13A is the same as the insulating layer 13.

The first electrode layer 14A is stacked on the insulating layer 13A on the side facing the liquid crystal The first electrode layer 14A entering into the contact holes CH is in contact with the wiring lines included in the conductive layer 15. Except for the above noted items, the first electrode layer 14A is the same as the first electrode layer 14.

The following describes a case where the arrangement pitch composed of a space D3 and a width D4 in the X-direction of the wiring lines included in the conductive layer 15 in the liquid crystal panel 1A is equal to the arrangement pitch composed of the space D1 and the width D2 in the X-direction of the wiring lines included in the conductive layer 12 in the liquid crystal panel 1. The space D3 in the X-direction where the insulating layer 13A is interposed between the wiring lines adjacently disposed in the X-direction out of the wiring lines included in the conductive layer 15 is larger than the space D1. By contrast, the width D4 in the X-direction of each of the wiring lines included in the conductive layer 15 is smaller than the width D2. This is because the contact holes CH allow the first electrode layer 14A to be in contact with the conductive layer 15, and the electric potential of the first electrode layer 14A can be controlled so as to establish the relation of the regions V1, V2, and V3 described with reference to FIG. 2 if the width D4 is smaller than the width D2. Therefore, if the conductive layer 15 is made of a non-light-transmitting conductive material, the liquid crystal panel 1A as a whole can exhibit such light transmittance property that causes substantially no problem in transmitting an image output from the display panel 60 described with reference to FIG. 4. The third modification can make the space D3 larger than the width D4.

In the third modification, the first electrode layer 14A and the conductive layer 15 are provided such that the difference in sheet resistance between the first electrode layer 14A and the conductive layer 15 is approximately 100:1. Except for the above noted items, the liquid crystal panel 1A is the same as the liquid crystal panel 1.

The liquid crystal panel 1A is disposed between the backlight and the user (e.g., the users H1 and H2) instead of the liquid crystal panel 1 described with reference to FIG. 4. The third modification can achieve the same advantageous effects as those according to the embodiment. In addition, the wiring lines included in the conductive layer 15 can be made thinner because the conductive layer is in contact with the first electrode layer 14A through the contact holes CH formed in the insulating layer 13A. Therefore, the conductive layer 15 can be made of non-light-transmitting material with higher conductivity and further improve the power efficiency.

The third modification can be combined with the first or the second modification. While the liquid crystal 30 according to the embodiment and the modifications described above is a TN liquid crystal, the liquid crystal panels 1 and 1A according to the present disclosure are not limited to TN liquid crystal panels. Any liquid crystal panel with a vertical electric field system can be employed as a light control panel, such as the liquid crystal panels 1 and 1A.

The specific aspect of a plurality of wiring lines (e.g., the wiring lines 121, . . . , and 12m) or a plurality of electrodes (e.g., the electrodes 1201 and 1202) included in the conductive layer 12 is not limited to the embodiment and the modifications described above and may be any desired aspect corresponding to intended orientation control for the liquid crystal.

The display panel 60 provided on the opposite side of the user (users H1 and H2) who views an image across the liquid crystal panels 1 and 1A is not limited to a liquid crystal panel. The display panel 60 may be a self-luminous display panel, such as an organic light-emitting diode (OLED) panel. The shape of the first electrode layer 14 and the liquid crystal panel 1 when viewed from the viewpoint of viewing the plane orthogonal to the Z-direction from the front is not limited to a rectangular shape and may be any desired shape.

Out of other advantageous effects achieved by the aspects described in the present embodiment, advantageous effects clearly defined by the description in the present specification or appropriately conceivable by those skilled in the art are naturally achieved by the present disclosure.

What is claimed is:

1. A liquid crystal panel comprising:
   a first substrate that is a light-transmitting substrate;
   a second substrate that is disposed facing the first substrate with a liquid crystal interposed between the first substrate and the second substrate and is a light-transmitting substrate;
   a conductive layer provided on the first substrate on a side facing the liquid crystal and comprising a plurality of wiring lines or a plurality of electrodes;
   an insulating layer stacked on the conductive layer on a side facing the liquid crystal;
   a first electrode layer stacked on the insulating layer on a side facing the liquid crystal;
   a second electrode layer provided on the second substrate on a side facing the liquid crystal; and
   a switch capable of opening and closing a coupling path between the first electrode layer and a reset potential, wherein
   a sheet resistance of the first electrode layer is higher than a sheet resistance of the conductive layer and a sheet resistance of the second electrode layer,
   the conductive layer comprises a conductor interposed in a conduction path between the first electrode layer and the switch, and
   the insulating layer has a contact hole that couples the first electrode layer and the conductor.

2. The liquid crystal panel according to claim 1, wherein the conductor is provided along two or more of four sides of the first electrode layer having a rectangular shape.

3. The liquid crystal panel according to claim 1, wherein
   the conductive layer and the first electrode layer are separated by the insulating layer, and
   each of the conductive layer, the first electrode layer, and the second electrode layer is a light-transmitting layer.

4. The liquid crystal panel according to claim 1, wherein
   the first electrode layer is in contact with the conductive layer through a plurality of contact holes formed in the insulating layer, and
   each of the first electrode layer and the second electrode layer is a light-transmitting layer.

5. The liquid crystal panel according to claim 4, wherein a polyimide layer is stacked on each of the first electrode layer on a side facing the liquid crystal and the second electrode layer on a side facing the liquid crystal.

6. The liquid crystal panel according to claim 1, further comprising a drive circuit capable of individually applying voltages to the wiring lines.

7. The liquid crystal panel according to claim 6, further comprising an opening/closing circuit configured to control opening and closing of the coupling path in conjunction with an operation of the drive circuit.

8. A display device comprising:
   a display panel configured to display an image; and
   the liquid crystal panel according to claim 1 stacked on a display surface of the display panel.

* * * * *